March 11, 1969   H. BLACK   3,431,810
WOOD FASTENERS
Filed Aug. 7, 1967

INVENTOR
HUGH BLACK
BY
Phillip A. Weiss
ATTORNEY

# United States Patent Office 3,431,810
Patented Mar. 11, 1969

3,431,810
WOOD FASTENERS
Hugh Black, 225 41st St., Downers Grove, Ill. 60515
Filed Aug. 7, 1967, Ser. No. 658,909
U.S. Cl. 85—11                                           10 Claims
Int. Cl. F16b 13/02

ABSTRACT OF THE DISCLOSURE

Wood fasteners having body sections comprising converging tapered peripheral resilient side walls especially adapted for use in joining plywood or compressed wood sections.

---

The furniture industry is continually searching for new and improved ways of invisibly joining together sections of materials such as wood. Nonetheless the industry still does not have a satisfactory fastener to accomplish such a connection. For example, the wood sections can be invisibly joined together using glue. The glue, however, tends to dry out and lose its adhesive characteristics such that the joined sections part, much to the consternation of the householder. The life of the article of furniture can, of course, be prolonged by techniques such as dovetailing the separate sections. The dovetailing, of course, appreciably increases the cost of the furniture. In addition, when the dovetailing arrangement is used, skilled craftsmen and/or high priced tools are required, rather than technicians.

Alternatively, of course, the well known nails or screws can be used for attaching the sections together. The drawback then is the time required to make the fasteners invisible. Countersinks and wood putty are commonly used in this operation. The results are never really top quality.

Another serious drawback of presently known fasteners is that they are not adapted to general use with plywoods or pressed woods. Thus, these modern woods are not commonly extensively used in better made furniture. The extensive use of such woods in the furniture industry is awaiting the invention of a fastener capable of invisibly but securely joining together pressed wood sections with a low incidence of misshaping and cracking the wood.

Accordingly, it is an object of the present invention to provide a wood fastener capable of use in invisibly joining together wood sections including pressed wood sections.

A related object of the present invention is to provide a wood fastener capable of joining relatively thin plywood sections.

A successful wood fastener has to be capable of securely fastening together all types of wood sections from soft pines to hard woods or pressed woods. Wood fasteners are available on the market today which have flat bodies and converging peripheral walls. These available fasteners, however, have serious drawbacks because they do not include features provided by the present invention which overcomes the "wedge" effect and the "displaced wood" effect of the presently available wood fasteners.

The adverse "wedge" effect is caused by the wedge shaped transverse cross section of the available fasteners which in combination with the "overcompression" or "displaced wood" effect caused by the converging peripheral walls overstress the wood sections except where soft woods are used. The overstress results in cracked wood and/or gaps in the joints where the two pieces of wood fastened together abut each other.

A related object of the present invention then is to provide wood fasteners which avoid the adverse "wedge" effect and "overcompression" effect even when used in hard or pressed woods.

A preferred embodiment of the present invention features a body section having converging peripheral walls. The peripheral walls are sufficiently resilient to overcome the "displaced wood" effect and are tapered to overcome the adverse wedge effect.

The above mentioned and other features of this invention and the manner of obtaining them will become more apparent, and the invention itself will be best understood by reference to the following description of an embodiment of the invention taken in conjunction with the accompanying drawings, in which.

Figure 1:
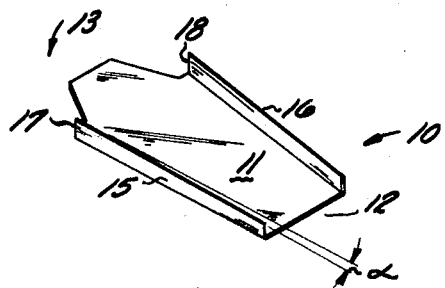
FIG. 1 is a pictorial representation of one embodiment of the present invention wherein the body is basically a flat section.

The fastener of FIG. 1 is generally designated by the fastener 10 and comprises a flat main body section 11 having a general keystone shape. The main portion of the body 11 is narrowest at its posterior end 12. The front or anterior section of main body 11 comprises a truncated triangular leading portion 13. Peripheral side walls 14, 15 rise at the outer side boundaries of the main body section 11.

Means are provided for avoiding any adverse wedge effect that may occur when the fastener is driven into wood sections that are to be securely fastened together. More specifically, the side walls are tapered from front to rear as shown in FIG. 1 by the angle α. The taper acts to preclude any misshaping or cracking of the wood sections. Any misshaping of the wood causes gaps at the joints where the wood pieces abut each other. The tapered walls provide the relief necessary to prevent overstressing the wood.

Additionally, the fastener is made sufficiently resilient to provide relief whereby the wood is not overstressed by the clamping action of the converging side walls.

The leading edges 17, 18 of walls 15, 16 respectively may be sharpened along with the leading edges of the truncated triangular section 13 to facilitate the entry of the fastener 10 into wood sections.

Figure 2:
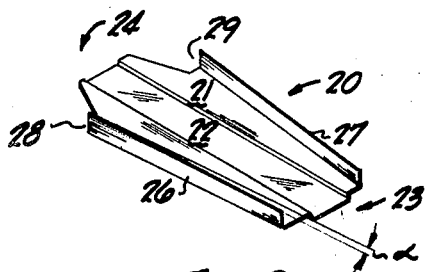
FIG. 2 is a pictorial representation of another embodiment of the present invention wherein the body comprises a characterized section.

Means are provided for increasing the resiliency of the fastener especially at the side peripheral walls. More specifically, FIG. 2 shows a fastener 20 having a characterized body. The main body 21 has a channel 22 therein which extends from the posterior end 23 of the main body through the anterior end 24. The fastener 20 is generally keystone shaped as is the fastener 10. The front end 13 can also be described as a truncated triangular section. The effect of the channel is to increase the resiliency of the fastener as it compresses the wood between the converging tapered peripheral side walls 26, 27. To aid the movement of the fastener when it is forced into the wood and to protect the wood, the leading edges 28, 29 of at least the side walls 26, 27 respectively are sharpened.

It should be understood that the channel 22 is shown merely as an example of the characterization of the body of the fastener which may be affected to increase the resiliency of the fastener. Thus, it is within the scope of the present invention to provide fasteners having many different shaped bodies such as those having arcuate, angular, or pleated bodies, and those having combinations of arcuate, angular or pleated bodies.

Figure 3:
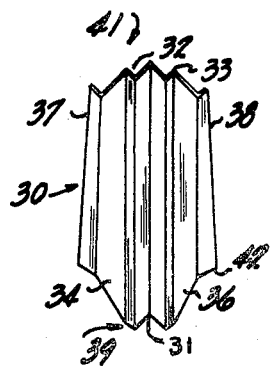
FIG. 3 is a pictorial representation of another embodiment of the present invention wherein the body is bent at right angles along the longitudinal center line.

The wide variations in shape that are within the scope of the present invention is illustrated by the fastener depicted in FIG. 3 and generally designated by the number 30. It may be noted that the fastener or clip 30 is similar to the fastener 20 except that fastener 30 is bent along its longitudinal center line 31. The channel defining walls after the bending operation are shown at 32, 33. The main body sections 34, 36 are now at an angle to each other. The peripheral walls 37, 38 are still tapered from the anterior end 39 to the posterior end 41 of the fastener 30. The leading edges of the walls and body may be sharpened at 42 for example, to improve the capability of the fastener to enter the pieces to be secured.

The fastener 30 is ideally suited for use in miter joints comprising plywood or pressed wood sections of ⅜ inch or less in thickness. It should be understood, of course, that while FIG. 3 depicts a fastener bent at approximately 90° along its longitudinal center line, the bend could be made along any longitudinal axis and still be within the scope of this invention.

Figure 4:
FIG. 4 shows a cross section of two mitered pieces of wood joined together by the inventive fastener.

FIG. 4 shows the fastener 20 of FIG. 2 in actual use in securing a miter joint. The miter joint comprises two beveled pieces of wood (natural, plywood or pressed wood) 46, 47 shown in cross section with fastener 20 below the surface of the wood. Note that the resiliency of the fastener is apparent from the shape of the fastener when in its "operating" condition. The resiliency in cooperation with the converging characteristic of the side walls of the fastener tends to clamp two abutting beveled pieces together securely with no gaps therebetween.

The effect of the characterization of the body of fastener 20 with channel 24 is illustrated and emphasized in FIG. 4. Note that the bottom of the channel acts as a fulcrum enabling the enchannelled portions of the main body 21 to bend into the splined section of the wood provided by the front truncated triangular lead or anterior section 24 of fastener 20.

While the wood pieces of FIG. 4 are shown abutting each other at a bevel it should be understood that the fastener functions with equal facility to fasten together contiguous sections of wood juxtaposed at right angles to each other. Also, while the fastener is shown in its preferred disposition, that is driven longitudinally into the joint, it could be used by driving it transversally into the joint.

Figure 5:
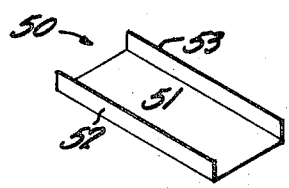
FIG. 5 pictorially shows an insertion tool for use in inserting the inventive fastener below the surface of the wood.

An insertion tool shown at FIG. 5 and generally designated as 50 is used to drive the inventive fasteners well below the surface of the wood to assure an invisible fastener. The insertion tool 50 may be generally channel shaped having a body 51 and side peripheral walls 52, 53.

The length of the insertion tool is governed by the lengths of the pieces of wood to be joined together. That is, the tool 50 must be sufficiently long to drive the fastener at least to the midpoint of the pieces to be coupled together.

To use the fastener, the pieces of wood to be joined are positioned in abutting relationship. Glue may be used between the pieces if it is so desired. Using the insertion tool such as tool 50, the abutting wood pieces may be preslotted or fasteners, such as fastener 20, may be driven longitudinally into the joint with approximately one-half the width of the fasteners in each section of wood. The preslotting is normally used on the harder wood pieces. On softer wood, the front section of the fastener and the leading edge of the peripheral walls, cut a groove in the wood. When the fastener is inserted into the wood, whether or not pregrooved, the converging walls clamp the wood together. The tapered resilient walls prevent damaging the wood and assure a secure joint that is invisibly fastened.

The inventive fastener drastically reduces furniture manufacturing production costs by reducing wood damage, making it possible for less expensive woods to be utilized and by enabling less skilled labor to fabricate the furniture. In addition, the fastener opens up the field for many new designs.

The increased use of plywood, and pressed woods in place of natural woods facilitated by the inventive fastener will reduce the current rapid depletion of the country's hardwood forests.

While the principles of the invention have been described above in connection with specific apparatus and applications, it is to be understood that this description is made only by way of example and not as a limitation on the scope of the invention.

I claim:
1. A fastener for securely joining material sections together,
   said fastener comprising an elongated body section having leading and trailing ends, said body section being generally wedge-shaped with the transverse dimension thereof being greater at the leading end of said body section than at the trailing end,
   a peripheral wall integral along each side edge of said body section, said peripheral walls being longitudinally spaced from the extremity of the leading end of said body section,
   said walls projecting out of the planes of said body, and being progressively tapered throughout the extent thereof reducing the height of said walls from the leading end to the trailing end thereof minimizing any wedge effect caused by said fastener.
2. The fastener of claim 1 wherein said walls tend to converge at the trailing end of said fastener and wherein the fastener is resilient to preclude overcompressing said material sections being joined together.
3. The fastener of claim 1 wherein said fastener body is generally keystone shaped with the larger dimension of said keystone shape being at the leading end thereof and wherein the leading end of said body extends axially beyond said side walls and comprises a truncated triangular section with the truncated portion defining the extremity of said leading end.
4. The fastener of claim 3 wherein said body is substantially flat.
5. The fastener of claim 3 wherein said body is configured to increase the resiliency at said peripheral side walls.
6. The fastener of claim 5 wherein said configuration comprises an arcuate shaped body.
7. The fastener of claim 5 wherein said configuration comprises a channel in said body.
8. The fastener of claim 5 wherein said body is bent at an angle along a longitudinal axis and wherein the leading edges of said fastener are sharpened.
9. A fastener for securely joining material sections together,
   said fastener comprising an elongated body section,
   said walls projecting out of the plane of said body section, and having a taper reducing the height of said walls from the leading end to the trailing end thereof minimizing any wedges caused by said fastener,
   said walls tending to converge at the trailing end of said fastener, and
   wherein the fastener is configured to render said fastener resilient to preclude overcompressing said material sections being joined together, and wherein said fastener body is generally keystone shaped with the larger dimension of said keystone shape being at the leading end thereof, and wherein the leading end of said body extends axially beyond said walls, and comprises a truncated triangular section with the truncated portion defined in the extremity of said leading end.

10. A joint comprising two pieces of pressed wood in abutting relationship to each other, and means comprising the fastener of claim 9 inserted longitudinally into the joint for securing said pieces in said abutting relationship.

References Cited

UNITED STATES PATENTS

| | | | |
|---|---|---|---|
| 240,938 | 5/1881 | White | 85—11 |
| 941,877 | 11/1909 | Hosch | 85—11 |
| 1,368,460 | 2/1921 | Siegler | 85—11 |
| 1,677,092 | 7/1928 | Jensen | 85—11 |
| 1,793,185 | 2/1931 | McChesney | 85—11 |
| 2,061,037 | 11/1936 | McChesney | 85—11 |

CARL W. TOMLIN, *Primary Examiner.*

RAMON S. BRITTS, *Assistant Examiner.*